United States Patent [19]

Tisdale, Sr. et al.

[11] 4,261,537
[45] Apr. 14, 1981

[54] VELOCITY VECTOR CONTROL SYSTEM AUGMENTED WITH DIRECT LIFT CONTROL

[75] Inventors: Robert A. Frosch, Administrator of the National Aeronautics and Space Administration, with respect to an invention of Henry F. Tisdale, Sr., Oakhurst, N.J.; Wendell W. Kelley, Newport News, Va.

[73] Assignee: The United States of America as represented by the Administrator of the National Aeronautics and Space Administration, Washington, D.C.

[21] Appl. No.: 15,996

[22] Filed: Feb. 28, 1979

[51] Int. Cl.³ .............................................. G05D 1/08
[52] U.S. Cl. .................................. 244/181; 244/195; 318/584; 364/434
[58] Field of Search ............................... 244/180–182, 244/186–188, 177, 195; 318/580, 584; 73/178 R; 364/433, 434, 435

[56] References Cited

U.S. PATENT DOCUMENTS

| | | | |
|---|---|---|---|
| 3,167,276 | 1/1965 | Moosbrugger et al. | 318/584 X |
| 3,237,107 | 2/1966 | Bresenoff et al. | 244/181 X |
| 3,399,849 | 9/1968 | Hendrick | 244/187 X |
| 3,618,878 | 11/1971 | Klein et al. | 244/188 |
| 3,860,800 | 1/1975 | Simpson | 364/434 X |
| 3,945,590 | 3/1976 | Kennedy, Jr. et al. | 244/181 X |

Primary Examiner—J. D. Miller
Assistant Examiner—Reinhard J. Eisenzopf
Attorney, Agent, or Firm—William H. King; John R. Manning; Howard J. Osborn

[57] ABSTRACT

A pilot controlled stability control system that employs direct lift control (spoiler control) with elevator control to control the flight path angle of an aircraft. A computer on the aircraft generates an elevator control signal and a spoiler control signal, using a pilot-controlled pitch control signal and pitch rate, vertical velocity, roll angle, groundspeed, engine pressure ratio and vertical acceleration signals which are generated on the aircraft. The direct lift control by the aircraft spoilers improves the response of the aircraft flight path angle and provides short term flight path stabilization against environmental disturbances.

10 Claims, 2 Drawing Figures

VELOCITY VECTOR CONTROL SYSTEM AUGMENTED WITH DIRECT LIFT CONTROL

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

The invention relates generally to aircraft control systems and more particularly concerns an aircraft flight path angle control system that employs direct lift control.

The flight path angle is the angle between the aircraft's inertial velocity vector and the local horizontal reference plane. In the past, pilot-controlled Stability Augmentation Systems (SAS) designed to control the flight path angle have utilized the aircraft's elevators (or horizontal stabilizers) for the control. The main disadvantage with these systems is there is a delay between the time the pilot changes the position of the elevators and the time the flight path angle changes in response thereto. Also with elevator control there is limited ability to counteract short term flight path fluctuation due to environmental disturbances.

It is the primary object of this invention to provide a pilot-controlled SAS that decreases the delay between the time that the pilot actuates his control until the time that the flight path angle changes in response thereto.

Another object of this invention is to provide short term flight path angle stabilization due to environmental disturbances.

Other objects and advantages of this invention will become apparent hereinafter and in the drawings.

SUMMARY OF THE INVENTION

This invention is a pilot controlled SAS that employs direct lift control in conjunction with the aircraft elevators to control the flight path angle. The direct lift control provides lift quickening and thus improves the response of the aircraft flight path to pilot commands. Also the direct lift control augments elevator control in providing short term flight path stabilization due to environmental disturbances. Long term flight path control is maintained by a high performance closed loop elevator control system.

A transducer generates a pitch control signal in response to pilot inputs and instruments on the aircraft generate signals proportional to pitch rate, vertical velocity, groundspeed, and vertical acceleration. A computer on board the aircraft receives these signals and generates an elevator control signal and a direct lift control signal for controlling the elevators and spoilers on the aircraft. In addition, a roll angle signal is generated on the aircraft and applied to the computer to cancel a loss of the vertical component of lift due to bank angles.

DETAILED DESCRIPTION OF THE INVENTION

Figure 1:
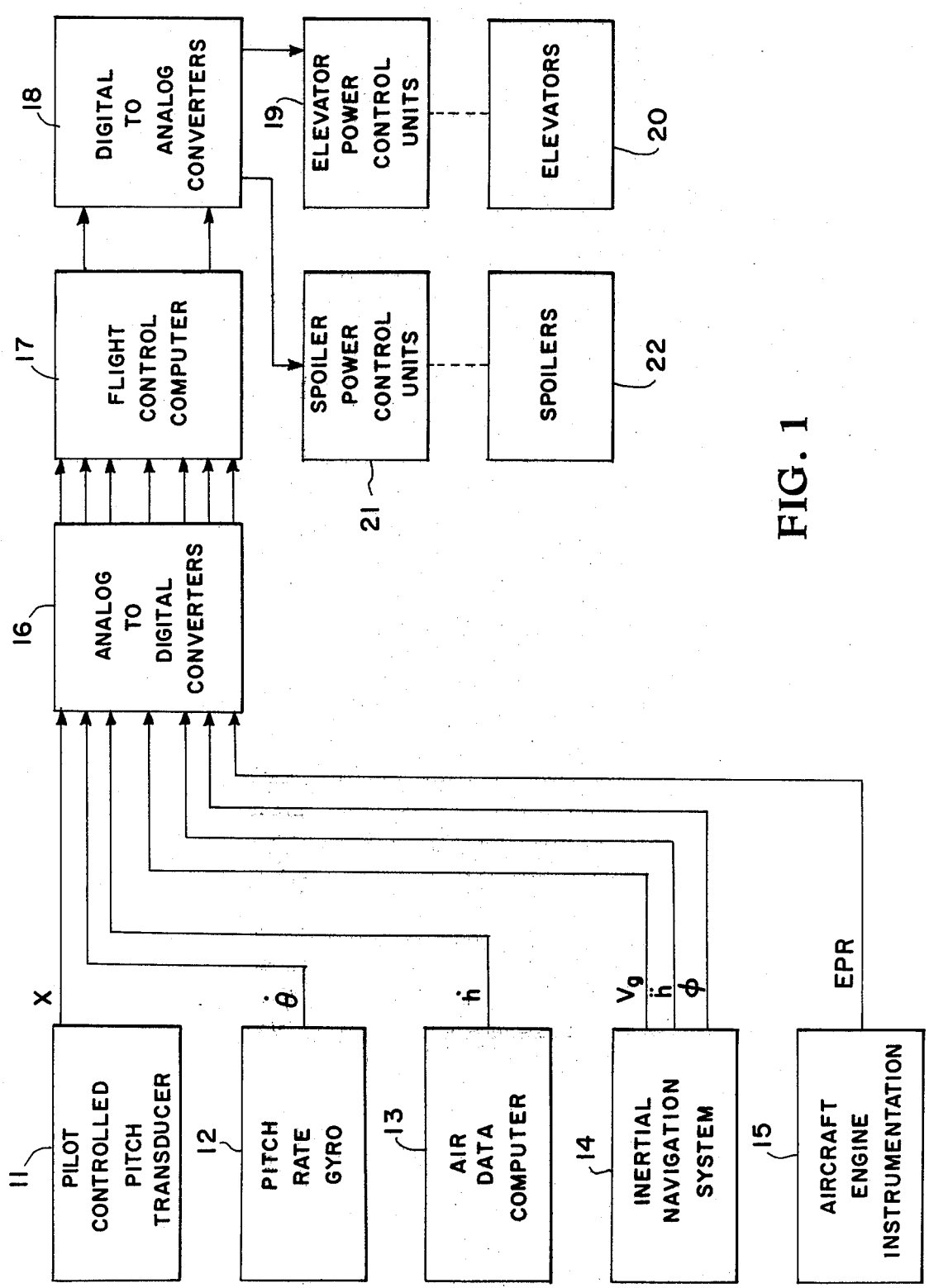
FIG. 1 is a block diagram of the preferred embodiment of the invention.

Turning now to the embodiment of the invention selected for illustration in the drawings the number 11 in FIG. 1 designates a pilot controlled pitch transducer which generates a pitch control signal X. In operating this invention the pilot views the flight path angle on the aircraft cockpit display and he changes the value of the pitch control signal X to change the flight path angle to some new commanded value. This invention quickens the response time between the time of a change of the pitch control signal X and the time the change is shown on the aircraft display as a change in the flight path angle. Moreover, this invention provides a well-damped, highly stable response.

Instrumentation on the aircraft generate feedback control signals: a pitch rate gyro 12 generates a pitch rate signal $\dot{\theta}$; an air data computer 13 generates a vertical velocity signal $\dot{h}$; an aircraft engine instrumentation 15 generates an EPR signal; and an inertial navigation system 14 generates a groundspeed signal $V_g$, a vertical acceleration signal $\ddot{h}$, and a roll angle signal $\phi$. The pitch control, pitch rate, vertical velocity, groundspeed, vertical acceleration, roll angle and EPR signals are all applied to analog-to-digital converters 16 where they are converted to digital signals. These digital signals are applied to a flight control computer 17 which generates an elevator control signal and a spoiler control signal. These elevator control and spoiler control digital signals are applied to digital-to-analog converters 18 which convert them to analog signals. The analog elevator control signal is applied to elevator power control units 19 to control the elevators 20 on the aircraft; and the analog spoiler control signal is applied to spoiler power control units 21 to control the spoilers 22.

Figure 2:
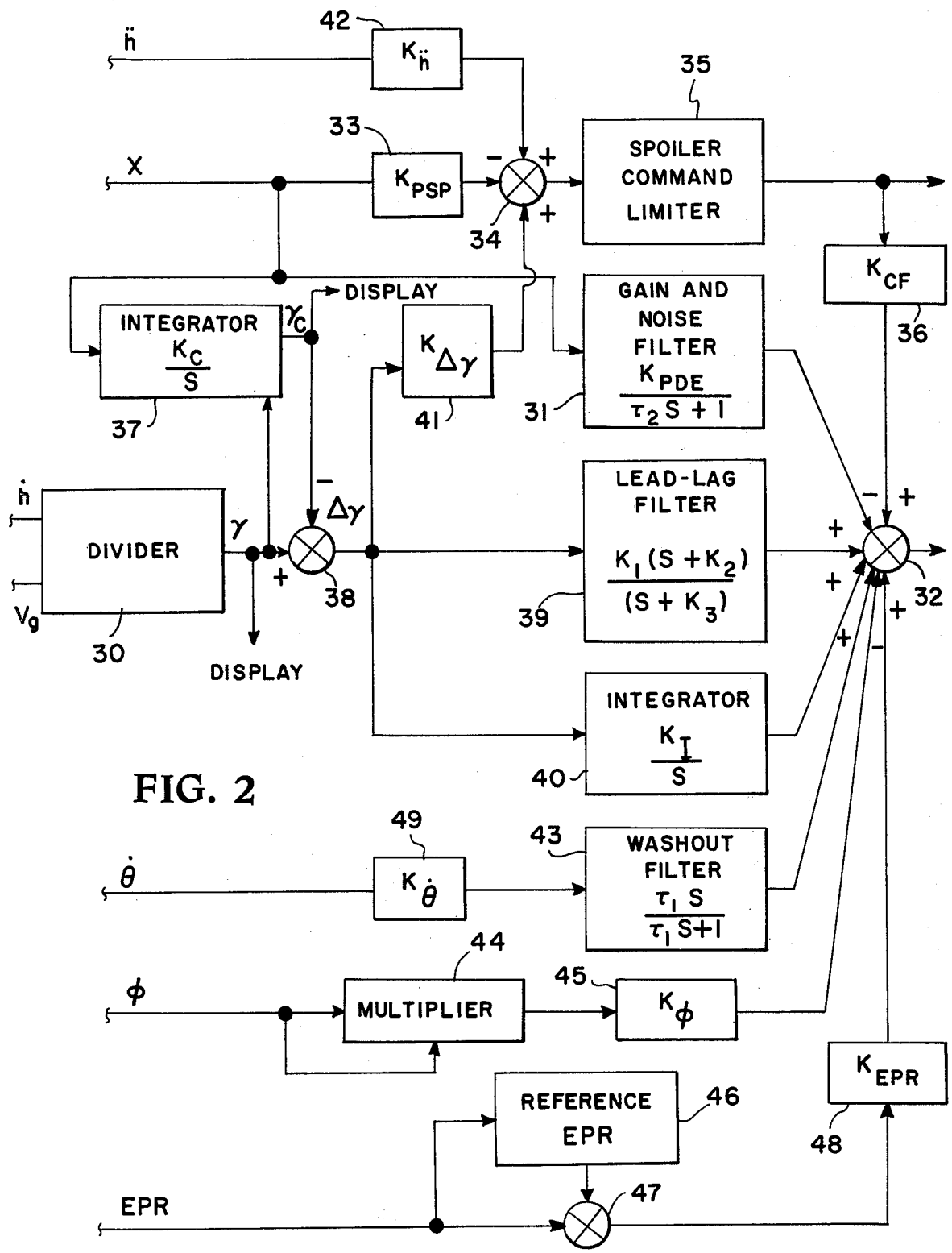
FIG. 2 is a block diagram of the flight control computer shown in FIG. 1.

Flight control computer 17 as shown in FIG. 2 includes a divider 30 which receives the vertical velocity and groundspeed signals and generates a flight path angle signal $\gamma$ by dividing the groundspeed signal into the vertical velocity signal. The pitch control signal X from the pilot-controlled transducer 11 is applied through a gain and noise filter 31 to a summing device 32. The output of summing device 32 is the elevator control signal. The signal from the gain and noise filter 31 initiates pitch response through the elevators. The characteristics of the gain and noise filter 31 is defined by the expression:

$$\frac{K_{PDE}}{\tau_2 s + 1}$$

where $K_{PDE}$ is a constant determined by the characteristics of the aircraft on which the system is used. $\tau_2$ is a time constant and s is a Laplace operator. The pitch control signal X is also applied to a constant multiplier 33 which multiplies X with a constant $K_{PSP}$. The output multiplier 33 is applied through a summing device 34 to a spoiler command limiter 35 the output of which is the spoiler control signal. The signal at the output of limiter 35 provides an immediate lift increment to start changing the flight path angle in a favorable direction. To counteract the spoiler pitching moment, the spoiler control signal at the output of limiter 35 is cross fed through a constant multiplier 36 which multiplies the signal by a constant $K_{CF}$ to a summing device 32 to provide additional elevator control.

At the instant the system is activated (turned on) by the pilot the flight path angle signal $\gamma$ at the output of divider 31 is applied to an integrator 37 to set the integrator to the initial value of $\gamma$. The pitch control signal X is then integrated by the integrator 37 to form the commanded flight path angle signal $\gamma_c$ at the output of the integrator. This signal is compared with the computed $\lambda$ signal at the output of divider 30 by means of a summing device 38 to produce an error signal $\Delta_{65}$.

The primary elevator stabilization signal is derived by passing the error signal $\Delta_\gamma$ through a high gain lead lag filter 39 the output of which is applied to summing device 32. The characteristic of filter 39 is defined by the expression:

$$\frac{K_1(s + K_2)}{s + K_3}$$

where $K_1$, $K_2$ and $K_3$ are constants. This part of the elevator control signal is the primary elevator stabilization signal. Filter 39 is the part of the invention that optimizes stability and response. The $\Delta_\lambda$ signal is also applied through an integrator 40 the output of which is applied to the summing device 32. This part of the elevator control signal takes care of possible steady-state standoff errors which would occur due to bias error signals or elevator trim requirements. In addition the signal $\Delta_\gamma$ is applied through a constant multiplier 41, which multiplies the signal by a constant $K_{\Delta\gamma}$, to summing device 34 to provide long term spoiler corrections for the flight path angle errors. The vertical acceleration signal $\ddot{h}$ from the inertial navigation system 14 is applied through a constant multiplier 42, which multiplies the signal by a constant $K_{\ddot{h}}$, to the summing device 34. This part of the spoiler control signal essentially provides a $\dot{\gamma}$ signal for stabilization.

The pitch rate signal $\dot{\theta}$ from the pitch rate gyro 12 is applied through a constant multiplier 49, which multiplies the signal by a constant $K_{\dot{\theta}}$, to a washout filter 43. The characteristic of filter 43 is defined by the expression:

$$\frac{\tau_1 s}{\tau_1 s + 1}$$

where $\tau_1$ is a time constant. The output of filter 43 is applied to summing device 32 to provide short period mode dampening in the elevator control signal. The roll angle signal $\phi$ from the inertial navigation system 14 is squared by a multiplier 44 and applied through a constant multiplier 45 to the summing device 32. Multiplier 45 multiplies the roll angle signal by a constant $K_\phi$ to cancel a loss of the vertical component of lift due to bank angles.

Another feature of the invention which is claimed in a co-pending application is the use of the EPR feedback for cancelling pitching moments due to thrust changes. The technique is based upon knowledge of the relationship between engine location, engine thrust, EPR, and elevator effectiveness. An analysis of these factors produces a gain of $K_{EPR}$ which when applied to the EPR feedback signal commands the proper amount of elevator to cancel thrust induced pitching moments. To implement this part of the elevator control signal the EPR signal initially sets the reference EPR 46 at the time the pilot engages the system. Thereafter the generated EPR signal is compared with the reference EPR signal by means of a summing device 47. The difference output of summing device 47 is multiplied by a constant $K_{EPR}$ by means of a constant multiplier 48 and then applied to summing device 32. Two benefits are immediately available from this scheme: pitch disturbances due to thrust changes are cancelled, and an elevator bias signal is provided downstream of the washout integrator 40 allowing a reduction in the integrator gain and thereby contributing to an increase in system stability.

All of the constants shown in the block diagram in FIG. 2 are determined by the particular aircraft on which the invention is used. A good estimate of each constant can be determined from the available data on the aircraft and thereafter the constants can be adjusted to obtain the desired responses.

This invention has been used on a flight simulator by Langley Research Center in Hampton, Va. The simulator represents a twin-engine medium jet transport that was modified to include an advanced research cockpit, direct lift control capability, and onboard flight research equipment. The values of the constants in FIG. 2 that were used are as follows:

$K_{\ddot{h}} = 4.9$
$K_{PSP} = 2.4$
Limiter $35 = \pm 8°$
$K_{cf} = 0.35$
$K_c = 0.33$
$K_{\Delta\gamma} = 8.0$
$K_{PDE} = 1.3$
$\tau_2 = 0.09$
$K_1 = 20.0$
$K_2 = 0.8$
$K_3 = 2.5$
$K_I = 0.3$
$K_{\dot{\theta}} = 4.0$
$\tau_1 = 16$
$K_\phi = 0.004$
$K_{EPR} = 8.2$ The advantages of this invention over previous pilot controlled stability augmentation systems are numerous. It provides lift quickening and thus improves the response of the aircraft flight path angle to pilot commands; it provides short term flight path stabilization against environmental disturbances; it improves the ride quality of the aircraft; it improves the pilot accuracy in tracking a glide slope; and it improves flare and touchdown performance of the aircraft.

What is claimed is:

1. An aircraft flight path angle control system that employs direct lift control comprising:
   a pilot controlled means for generating a pitch control signal;
   means on the aircraft for generating feedback signals proportional to the vertical velocity, and the groundspeed;
   first computer means receiving said pitch control signal for generating a direct lift control signal;
   second computer means receiving said pitch control, vertical velocity, and groundspeed signals for generating an elevator control signal said second computer means including means for generating a primary elevator stabilization signals, means for generating a signal for initiating pitch response, means for generating a possible standoff errors signal and means for summing the last three mentioned generated signals to generate the elevator control signal;
   means responsive to said elevator control signal for controlling the elevators on said aircraft; and means responsive to said lift control signal for controlling the direct lift controls on said aircraft.

2. An aircraft flight path control system according to claim 1 including means on the aircraft for generating a feedback signal proportional to pitch rate that is applied to said second computer means which includes means for generating a short-period mode damping signal that is applied to said summing means.

3. An aircraft flight path control system according to claims 1 or 2 including means on the aircraft for generating a feedback signal proportional to vertical acceleration that is applied to said first computer means which includes means for combining a stabilization signal with said direct lift control signal.

4. An aircraft flight path control system according to claims 1 or 2 including means on the aircraft for generating a feedback signal porportional to roll angle that is applied to said second computer means which includes means for combining with the elevator control signal a signal to cancel a loss of the vertical component of lift due to bank angles.

5. An aircraft flight path angle control system according to claim 1 wherein said first computer means includes a first constant multiplier for multiplying said pitch control signal by a constant to form said direct lift control signal.

6. An aircraft flight path angle control system according to claim 5 wherein said second computer means comprises:

a divider receiving said vertical velocity and groundspeed signals for dividing the groundspeed signal into the vertical velocity signal to form a computed flight path angle signal;

a first integrator means receiving said pitch control signal for forming a commanded flight path angle signal;

a second summing means for obtaining an error signal which is the difference between the computed and commanded flight path angle signals;

a lead-lag filter means receiving said error signal for producing said primary elevator stabilization signal;

a second integrator means receiving said error signal for producing said possible standoff errors signal;

a gain and noise filter means receiving said pitch control signal for producing said signal for initiating pitch response;

a second constant multiplier receiving said direct lift control signal for providing an additional elevator control signal; and the first said summing means for combining said primary elevator stabilization, possible standoff errors, initiating pitch response and additional elevator control signals to form said elevator control signal.

7. An aircraft flight path angle control system according to claim 6 including a third constant multiplier receiving said error signal for producing a long-term spoiler corrections signal, and a third summing means receiving the long-term spoilor corrections signal and the signal at the output of said first constant multiplier for combining the two signals to form said direct lift control signal.

8. An aircraft flight path angle control system according to claim 7 including means on the aircraft for generating a vertical acceleration feedback signal, a fourth constant multiplier receiving said vertical acceleration feedback signal for producing a spoiler stabilization signal and means provided with said third summing means for combining said spoiler stabilization signal with long-term spoiler corrections signal and the signal at the output of said first constant multiplier to form said direct lift control signal.

9. An aircraft flight path angle control system according to claims 7 or 8 including means on the aircraft for generating a feedback pitch rate signal, a fifth constant multiplier receiving said pitch rate signal for multiplying it with a constant, a washout filter means receiving an output of said fifth constant multiplier for producing a short-period mode damping signal and means for combining said short-period mode damping signal with said elevator control signal.

10. An aircraft flight path angle control system according to claim 9 including means on said aircraft for generating a feedback roll angle signal, means for squaring said roll angle signal and multiplying it by a constant to form a signal for cancelling a loss of the vertical component of the lift due to bank angles and means for combining the last mentioned signal with the elevator control signal.

* * * * *